United States Patent
Lawrence et al.

(10) Patent No.: US 6,738,780 B2
(45) Date of Patent: *May 18, 2004

(54) AUTONOMOUS CITATION INDEXING AND LITERATURE BROWSING USING CITATION CONTEXT

(75) Inventors: Stephen R. Lawrence, New York, NY (US); Kurt D. Bollacker, Austin, TX (US); C. Lee Giles, Lawrenceville, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 151 days.

This patent is subject to a terminal disclaimer.

(21) Appl. No.: 09/859,031

(22) Filed: May 16, 2001

(65) Prior Publication Data

US 2002/0156760 A1 Oct. 24, 2002

Related U.S. Application Data

(63) Continuation of application No. 09/082,071, filed on May 20, 1998, now Pat. No. 6,289,342.
(60) Provisional application No. 60/070,489, filed on Jan. 5, 1998.

(51) Int. Cl.[7] .................................... G06F 17/00
(52) U.S. Cl. ................... 707/101; 707/2; 707/3; 707/5; 707/7; 707/102
(58) Field of Search ................... 707/2, 3, 5, 101, 707/102, 7; 345/810; 715/532

(56) References Cited

U.S. PATENT DOCUMENTS

| | | | | |
|---|---|---|---|---|
| 5,375,235 A | | 12/1994 | Berry et al. ................... 707/5 |
| 5,594,897 A | | 1/1997 | Goffman ....................... 707/102 |
| 5,642,522 A | | 6/1997 | Zaenen et al. ................ 716/532 |
| 5,701,498 A | * | 12/1997 | Goach, Jr. et al. ............ 707/102 |
| 5,768,528 A | * | 6/1998 | Stumm ........................ 709/231 |
| 5,794,236 A | | 8/1998 | Mehrle ......................... 707/5 |
| 5,797,008 A | * | 8/1998 | Burrows ....................... 707/101 |
| 5,835,087 A | | 11/1998 | Herz et al. ................... 345/810 |
| 5,845,273 A | | 12/1998 | Jindal .......................... 707/1 |
| 5,848,409 A | | 12/1998 | Ahn ............................ 707/3 |
| 5,848,410 A | | 12/1998 | Walls et al. .................. 707/4 |
| 5,878,421 A | * | 3/1999 | Ferrel et al. ................. 707/100 |
| 5,907,837 A | | 5/1999 | Ferrel et al. ................. 707/3 |
| 5,930,784 A | | 7/1999 | Hendrickson ................. 707/2 |
| 5,978,797 A | | 11/1999 | Yianilos ....................... 707/3 |
| 6,085,185 A | | 7/2000 | Matsuzawa et al. .......... 707/2 |
| 6,199,082 B1 | * | 3/2001 | Ferrel et al. ................. 707/522 |

OTHER PUBLICATIONS

Peapcke, "An Object–Oriented View Onto Public, Heterogenous Text Databases", IEEE, 1993, pp. 484–493.*

E. Garfield, "Citation Indexing: Its Theory and Application in Science, Technology and Humanities", ISI Press, Philadephia, 1979.

M. Pazzani et al., "Syskill & Webert: Identifying Interesting Web Sites", Proceedings of the National Conference on Artificial Intelligence (AAAI96), 1996.

F. Menczer, "ARCHNID: Adaptive Retieval Agents Choosing Heuristic Neighborhoods for Information Discovery", Machine Learning: Proceedings of the 14th International Conference, 1997.

(List continued on next page.)

*Primary Examiner*—Thuy N. Pardo

(57) ABSTRACT

An autonomous citation indexing system which can be used as an assistant agent automates and enhances the task of finding publications in electronic form, including publications located on the world wide web. The system parses citations from papers and identifies citations to the same paper that may differ in syntax. The system also extracts and provides the context of citations to a given paper, allowing a researcher to determine what is published in other papers about a given paper. Common citations and word or string vector distance similarity are used to find related articles in a search.

8 Claims, 9 Drawing Sheets

OTHER PUBLICATIONS

M. Balabanović, "An Adaptive Web Page Recommendation Service", Proceedings of the First International Conference on Autonomous Agents, ACM Press, New York, 1997.

E. Garfield, "The Concept of Citation Indexing: An Unique and Innovative Tool for Navigating the Research Literature", Current Contents, 1994.

R.D. Cameron, "A Universal Citation Database as a Catalyst for Reform in Scholarly Communication", Technical Report CMPT TR 95–07, School of Computing Science, Simon Fraser University, 1995, 1997.

P. Yianilos et al., "The LIKCIT Intelligent String Comparison Facility", NEC Research Institute Technical Report No. 97–093, 1997.

P. Yianilos, "Data Structures and Algorithms for Nearest Neighbor Search in General Metric Spaces", Proceedings of the $4^{th}$ ACM–SIAM Symposium on Discrete Algorithms, 1997.

G. Salton et al., "Term Weighting Approaches in Automatic Text Retieval", Technical Report 87–881, Department of Computer Science, Cornell University, 1987.

G. Salton, "Automatic Indexing Using Bibliographic Citations", Journal of Documentation 27, 1971.

B. Starr et al., "Do I Care?—Tell Me What's Changed on the Web", Proceedings of the AAAI Spring Symposium on Machine Learning in Information Access Technical Papers, 1996.

S. Loke et al., "CIFI: An Intelligent Agent for Citation Finding on the World–Wide Web", Technical Report 96/4, Department of Computer Science, University of Melbourne, 1996.

* cited by examiner

FIG. 2

Query: citation: +Giles +Chen

| Citations | Article |
|---|---|
| 12 | Giles, C.L., Sun, G.Z., Chen, H.H., Lee, Y.C., Chen, D., (1990) *"Higher Order Recurrent Networks and Grammatical Inference,"* Advances in Neural Information Processing Systems 2, D.S. Touretzky (ed), Morgan Kaufmann, San Mateo, CA, (1990), p. 380. (Details) |
| 10 | Giles, C.L., Miller, C.B., Chen, D., Chen, H.H., Sun, G.Z., & Lee, Y.C. (1992). *Learning and extracting finite state automata with second-order recurrent networks.* Neural Computation, 2, 331-349. (Details) |
| 9 | C. Giles, C. Miller, D. Chen, G. Sun, H. Chen, and Y. Lee, *"Extracting and learning an unknown grammar with recurrent neural networks,"* in Advances in Neural Information Processing Systems 4 (J. Moody, S. Hanson, and R. Lippmann, eds.), San Mateo (Details) |
| 2 | T. Maxwell, C. L. Giles, Y. C. Lee, and H. H. Chen. *Transformation invariance using high order correlations in neural net architectures.* In Proceedings of the IEEE international conference on systems, man, and cybernetics, pages 627--632, October (Details) |
| 2 | M. Goudreau, C. Giles, S. Chakradhar, and D. Chen, *"First-order vs. second-order single layer recurrent neural networks,"* IEEE Transactions on Neural Networks, vol. 5, no. 3, pp. 511--513, 1994. (Details) |
| 1 | Y. C. Lee, G. Doolen, H. Chen, G. Sun, T. Maxwell, H. Lee, and C. L. Giles. *Machine Learning Using a Higher Order Correlation Network.* Physica D: Nonlinear Phenomena, vol. 22, pp. 276--306, 1986. ISSN: 0167-2789 (Details) |

36 citations found

FIG. 3

| | |
|---|---|
| | CiteSeer Home Help Suggestions |
| Query: | dempster |

| Citations | Article |
|---|---|
| 76 | Dempster, A., Laird, N., Rubin, D. 1977. *Maximum likelihood from incomplete data via the EM algorithm*. Journal of the Royal Statistical Society, Series B. 39, 1--38. (Details) |
| 3 | Dempster A.P. (1967) *Upper and lower probabilities induced by a multivalued mapping*. Ann. Math. Statis. 38, 325-339. (Details) |
| 1 | Wilson, N., 1991, *A Monte-Carlo Algorithm for Dempster-Shafer Belief*, Proc. 7th Conference on Uncertainty in Arti- ficial Intelligence, B. D'Ambrosio, P. Smets and P. Bonissone (eds.), Morgan Kaufmann, 414-417. (Details) |
| 1 | Wilson, N., 1993, The Assumptions Behind Dempster's Rule, Proceedings of the Ninth Conference of Uncertainty in Artificial Intelligence (UAI93), David Heckerman and Abe Mamdani (eds.), Morgan Kaufmann Publishers, San Mateo, California, 527--53 (Details) |
| 1 | A. Dempster, "*Construction and Local Computation Aspects of Network Belief Functions,*" in Influence Diagrams, Belief Nets and Decision Analysis, editors: R. Oliver and J. Smith, John Wiley & Sons Ltd., pp. 121-141, 1990. (Details) |
| 1 | Dempster, A.P. (1971). *Model searching and estimation in the logic of inference*. In Foundations of Statistical Inference (eds. V.P. Godambe and D.A. Sprott), Toronto: Holt, Rinehart and Winston of Canada. (Details) |
| 1 | A. P. Dempster, *A Generalization of Bayesian Inference (with discussion), J. Royal Statistical Society ser.* B 30: 205-247, 1968. (Details) |

[ ...section deleted... ]

FIG. 4

Query: document: +recurrent +series

NEURAL DYNAMICS OF VARIABLE-RATE
SPEECH CATEGORIZATION
by
Stephen Grossbergz, Ian Boardmany, and Michael Cohenz
Department of Cognitive and Neural Systems
and
Center for Adaptive Systems
Boston University (Details) (Find Similar Articles)

RESONANCE AND THE PERCEPTION OF
MUSICAL METER
Edward W. Large
John F. Kolen
The Ohio State University (Details) (Find Similar Articles)

[...section deleted...]

276 documents found.

FIG. 5

Query: document: +recurrent +series

RESONANCE AND THE PERCEPTION OF
MUSICAL METER
Edward W. Large
John F. Kolen
The Ohio State University This document can be downloaded from: ftp://archive.cis.ohio-state.edu/pub/neuroprose/large.resonance.ps.Z Abstract: Many connectionist approaches to musical expectancy and music composition let the question of "What next?" overshadow the equally important question of "When next?". One cannot escape the latter question, one of temporal structure, when considering the perception of musical meter. We view the perception of metrical structure as a dynamic process where the temporal organization of external musical events synchronizes, or entrains, a listener's internal processing mechanisms. This article introduces a novel connectionist unit, based upon a mathematical model of entrainment, capable of phase- and frequency-locking to periodic components of incoming rhythmic patterns. Networks of these units can self-organize temporally structured responses to rhythmic patterns. The resulting network behavior embodies the perception of metrical structure. The article concludes with a discussion of the implications of our approach for theories of metrical structure and musical expectancy. Connection Science, 6 (1), 177 - 208. RESONANCE AND THE PERCEPTION OF MUSICAL METER 1 (Find Similar Items)

Citations made by this document:

Apel, W. (1972) *Harvard dictionary of music (2nd ed.)*. Cambridge, MA: Belknap Press of Harvard University Press. (Details)

Allen, P. E. & Dannenberg, R. B. (1989) *Tracking musical beats in real time*. In Proceedings of the 1990 International Computer Music Conference. Computer Music Association. (Details)

Beek, P. J., Peper, C. E. & van Wieringen, P. C. W. (1992) Frequency locking, frequency modula- tion, *and bifurcations in dynamic movement systems*. In G.E. Stelmach and J. Requin (Eds.) Tutorials in motor behavior II. Elsevier Science Publishers B. V. (Details)

Bharucha, J. J. & Todd, P. M. (1989) *Modeling the perception of tonal structure with neural nets*. Computer Music Journal, 13, 44-53. (Details)

Bodenhausen, U. &Waibel, A. (1991) *The Tempo 2 algorithm: Adjusting time delays by supervised learning*. In R. P. Lippmann, J. Moody, & D. S. Touretsky (Eds.) Advances in Neural Information Processing Systems 3. San Mateo, CA: Morgan Kaufman. Bolton, T. (Details)

Carpenter, G. A. & Grossberg, S. (1983) *A neural theory of circadian rhythms: The gated pacemaker*. Biological Cybernetics, 48, 35-59. (Details)

[...section deleted...]

80 citations

FIG. 6

Query: citation: +Giles +Chen

C. L. Giles, C. B. Miller, D. Chen, G. Z. Sun, H. H. Chen, and Y. C. Lee. Extracting and learning an unknown grammar with recurrent neural networks. In J. E. Moody, S. J. Hanson, and R. P. Lippman, editors, Advances in Neural Information Processing Systems This paper is cited in the following contexts:

---

Learning Sequential Tasks by Incrementally Adding Higher Orders Mark Ring (Details)

......units can be added to reach into the arbitrarily distant past. Experiments with the Reber grammar have demonstrated speedups of two orders of magnitude over recurrent networks. 1 INTRODUCTION Second-order recurrent networks have proven to be very powerful [8], especially when trained using complete back propagation through time [1, 6, 14]. It has also been demonstrated by Fahlman that a recurrent network that incrementally adds nodes during training---his Recurrent Cascade-Correlation algorithm [5]---can be superior to non-incremental, recurrent networks [2, 4, 11, 12, 15]. The incremental, higher-order network presented here combines advantages of both of these approaches in a non-recurrent network.......

C. L. Giles, C. B. Miller, D. Chen, G. Z. Sun, H. H. Chen, and Y. C. Lee. *Extracting and learning an unknown grammar with recurrent neural networks.* In J. E. Moody, S. J. Hanson, and R. P. Lippman, editors, Advances in Neural Information Processing Systems

---

Sequence Learning with Incremental Higher-Order Neural Networks Mark Ring (Details)

......output of two units): in i (t + 1) = X j X k w ijk out j (t)out k (t): The second-order terms seem to have a notably positive effect on the networks, which have been shown to learn difficult tasks with a small number of training samples [1, 5, 11]. The networks are cumbersome, however, having O(n 3) weights (where n is the number of neurons); and in order to get good performance, true gradient descent must be done [10, 12], which is also quite cumbersome. A different method for getting good performance in a recurrent neural-network is......

C. L. Giles, C. B. Miller, D. Chen, G. Z. Sun, H. H. Chen, and Y. C. Lee. *Extracting and learning an unknown grammar with recurrent neural networks.* In J. E. Moody, S. J. Hanson, and R. P. Lippman, editors, Advances in Neural Information Processing Systems

---

[...section deleted...]

FIG. 7

Dempster, A., Laird, N., Rubin, D.1977. Maximum likelihood from incomplete data via the EM algorithm. Journal of the Royal Statistical Society, Series B. 39, 1--38

This paper is cited in the following contexts:

---

Probabilistic Independence Networks for Hidden Markov Probability Models 1 Padhraic Smyth 2 Jet Propulsion Laboratory 525-36 ... (Details)

......is called as a subroutine on the tractable graph during the minimization process. 9 Learning and PINs 9.1 Parameter Estimation for PINs The parameters of a graphical model can be estimated with maximum-likelihood (ML), maximum-a-posteriori (MAP), or full Bayesian methods, using traditional techniques such as gradient descent, expectation-maximization (EM) (e.g., Dempster et al., 1977), and Monte-Carlo sampling (e.g., Neal, 1993). For the standard HMM(1,1) model discussed in this paper, where either discrete, Gaussian, or Gaussian-mixture codebooks are used, a ML or MAP estimate using EM is a well-known efficient approach (Poritz 1988; Rabiner 1989). An important aspect of the application of......

Dempster, A., Laird, N., Rubin, D.1977. *Maximum likelihood from incomplete data via the EM algorithm.* Journal of the Royal Statistical Society. Series B. 39, 1--38.

---

Some Solutions to the Missing Feature Problem in Vision (Details)

......the weight from the j'th basis unit to the i'th output unit, is the probability of choosing unit j, and d is the dimensionality of . 4.1 GBF NETWORKS AND MISSING FEATURES Under certain training regimes such as Gaussian mixture modeling, EM or "soft clustering" (Duda & Hart, 1973; Dempster et al, 1977; Nowlan, 1990) or an approximation as in (Moody & Darken, 1988) the hidden units adapt to represent local probability densities. In particular and . This is a major advantage of this architecture and can be exploited to obtain closed form solutions to (1) and (3). Substituting......

A.P. Dempster, N.M. Laird, and D.B. Rubin. (1977) *Maximum likelihood from incomplete data via the EM algorithm.* J. Royal Statistical Soc. Ser. B, 39:1-38.

---

A New View of the EM Algorithm that Justifies Incremental and Other Variants Radford M. Neal and Geoffrey E. Hinton... (Details)

......other variant algorithms are also seen to be possible. Some key words: EM algorithm, incremental algorithms, free energy, mixtures Submitted to Biometrika 1 Introduction The Expectation-Maximization (EM) algorithm finds maximum likelihood parameter estimates in problems where some variables were unobserved. Its wide-spread applicability was first discussed by Dempster, Laird, and Rubin (1977). The EM algorithm estimates the parameters iteratively, starting from some initial guess. Each iteration consists of an Expectation (E) step, which finds the distribution for the unobserved variables, given the known values for the observed variables and the current estimate of the parameters, and a Maximization......

Dempster, A. P., Laird, N. M., and Rubin, D. B. (1977) *Maximum likelihood from incomplete data via the EM algorithm (with discussion).* Journal of the Royal Statistical Society B, vol. 39, pp. 1-38.

---

[ ...section deleted... ]

FIG. 10

Query: wavelet

On the Improvements of Embedded Zerotree Wavelet (EZW) Coding, Jin Li and Po-Yuen Cheng and C.-C. Jay Kuo, Signal and Image Processing Institute and Department of Electrical Enineering-Systems, University of Southern California, Los Angeles, California 90089-2564

Related papers:

---

Similarity = 0.525

IEEE Transactions on Circuits and Systems for Video Technology, Vol. 6, June 1996
A New Fast and Efficient Image Codec Based
on Set Partitioning in Hierarchical Trees \Lambda
Amir Said
Faculty of Electrical Engineering, P.O. Box 6101
State University of Campinas (UNICAMP), Campinas, SP, 13081, Brazil
William A. Pearlman
Department of Electrical, Computer, and Systems Engineering
Rensselaer Polytechnic Institute, Troy, NY, 12180, U.S.A.
(Details) (Download) (Find Similar Items)

Abstract: Embedded zerotree wavelet (EZW) coding, introduced by J. M. Shapiro, is a very effective and computationally simple technique for image compression. Here we offer an alternative explanation of the principles of its operation, so that the reasons for its excellent performance can be better understood. These principles are partial ordering by magnitude with a set partitioning sorting algorithm, ordered bit plane transmission, and exploitation of self-similarity across different scales of an image wavelet transform. Moreover, we present a new and different implementation, based on set partitioning in hierarchical trees (SPIHT), which provides even better performance than our previosly reported extension of the EZW that surpassed the performance of the original EZW. The image coding results, calculated from actual file sizes and images reconstructed by the decoding algorithm, are either compara- ble to or surpass previous results obtained through much more sophisticated and computationally complex methods. In addition, the new coding and decoding pro- cedures are extremely fast, and they can be made even faster, with only small loss in performance, by omitting entropy coding of the bit stream by arithmetic code. 1.

Similarity = 0.46785714285714

SPIE's 1996 Symp. on Visual Communications and Image Processing '96
Three-Dimensional Subband Coding of Video
Using the Zero-Tree Method
Yingwei Chen and William A. Pearlman
Department of Electrical, Computer, and Systems Engineering
Rensselaer Polytechnic Institute, Troy, NY 12180
yingwei@ipl.rpi.edu, pearlman@ecse.rpi.edu
(Details) (Download) (Find Similar Items)

Abstract: In this paper, a simple yet highly effective video compression technique is presented. The zero-tree method by Said [3,4], which is an improved version of Shapiro's [1,2] original one, is applied and expanded to three-dimension to encode image sequences. A three-dimensional subband transfor- mation on the image sequences is first performed, and the transformed information is then encoded using the zero-tree coding scheme. The algorithm achieves results comparable to MPEG-2, with- out the complexity of motion compensation. The reconstructed image sequences have no blocking effects at very low rates, and the transmission is progressive. Key word list: video compression, subband coding, video coding, progressive transmission, image sequence coding. 1

[...section deleted...]

AUTONOMOUS CITATION INDEXING AND LITERATURE BROWSING USING CITATION CONTEXT

CROSS-REFERENCE TO RELATED APPLICATIONS

This application is a continuation of U.S. patent application Ser. No. 09/082,071, filed May 20, 1998 now U.S. Pat. No. 6,289,342, which claims the benefit of U.S. Provisional Application No. 60/070,489, filed Jan. 5, 1998.

FIELD OF INVENTION

The present invention relates to autonomous citation indexing. Specifically, an autonomous citation indexing system is completely automatic, autonomously extracts citations, identifies identical citations which occur in different formats, and identifies the context of citations in the body of the articles.

BACKGROUND OF THE INVENTION

A citation index indexes citations contained in articles, linking the articles with the cited works. Citation indexing was originally designed for information retrieval. A citation index allows navigation backward in time by following the list of cited articles and forward in time by tracking which subsequent articles cite any given article.

The rate of production of scientific literature continues to increase, making it time consuming for researchers to stay current. Most published scientific research appears in paper documents such as scholarly journals or conference proceedings. There is a considerable time delay between the completion of research and the availability of the publication. Thus, the World Wide Web ("the web") has become an important distribution medium for scientific research. An increasing number of authors are making new research available on the web in the form of preprints or technical reports which can be downloaded and printed. These web publications are often available before any corresponding printed publication in journals or conference proceedings. In order to keep current on research, especially in rapidly advancing fields, a researcher can search the web to download papers as soon as they are written. Literature available on the web is easier to access. The web, however, does have its own limitations for searching. The web lacks a standardized organization, publications themselves tend to be poorly organized (each institution or researcher may have its, his or her own organizational scheme), and publications are often spread throughout the web. A researcher could spend large amounts of time solely for searching, downloading and printing papers to read in order to find those publications that may be important. However, web based literature can be read and processed by autonomous agents far more easily than printed documents. Agents can search the web and thereby provide an automated means to find, download and judge the relevance of web publications. The present invention concerns just such an agent. An assistant agent is a computer program which automatically performs some task on behalf of a user.

One method for finding relevant and important publications on the web is to use a combination of Web Search Engines and manual web browsing. Web search engines such as AltaVista (http://altavista.digital.com) index the text contained on web pages, allowing users to find information with keyword search. Some research publications on the web are made available in HTML (HyperText Markup Language) format, making the text of these papers searchable with web search engines. However, most of the published research papers on the web are in Postscript form (which preserves the formatting of the original), rather than HTML. The text of these papers is not indexed by search engines such as AltaVista, requiring researchers to locate pages which contain links to these papers, e.g. by searching for a paper by title or author name. Another limitation of the web search engines is that they typically only use word frequency information to find relevant web pages, although other types of information are potentially useful, e.g. papers which contain citations of common earlier papers may be related.

In the following text, reference will be made to several publications in the open literature. These publications are herein incorporated by reference.

The present invention benefits from three areas of prior work. The first involving citation indexing which indexes the citations made between academic articles. See, for example, in Chapters 1 to 3 and Chapter 10 of the book by E. Garfield, entitled "Citation Indexing: Its Theory and Application in Science, Technology and Humanities", ISI Press, Philadelphia, 1979.

The second concerning semantic distance measures between text documents. Research in this area is directed towards finding quantifiable and useful measures of similarity or relatedness between bodies of text.

The third, web, interface and assistant software agents. Several papers have addressed the problem of locating "interesting" web pages. For example, articles including those by M. Pazzani, J. Muramatsu and D. Billsus, entitled "Syskill & Webert: Identifying interesting web sites" in Proceedings of the National Conference on Artificial Intelligence (AAAI96), 1996; by F. Menczer, entitled "Arachnid: Adaptive retrieval agents choosing heuristic neighborhoods for information discovery" in Machine Learning: Proceedings of the Fourteenth International Conference, pp. 227–235, 1997; by M. Balabanovic, entitled "An adaptive web page recommendation service" in Proceedings of the First International Conference on Autonomous Agents, ACM Press, New York, pp. 378–385, 1997; and by A. Moukas, entitled "Amalthaea: Information discovery and filtering using a multiagent evolving ecosystem" in Proceedings of the Conference on Practical Applications of Agents and Multiagent Technology, 1996. This includes work which uses learning techniques based on user feedback.

In citation indexing, references contained in articles are used to give credit to previous work in the literature and provide a link between the "citing" and "cited" articles. A citation index, such as Garfield, supra, indexes the citations that an article makes, linking the articles with the cited works. Citation indexes were originally designed mainly for information retrieval, as referenced by E. Garfield in an article entitled "The concept of citation indexing: A unique and innovative tool for navigating the research literature" Current Contents, Jan. 3, 1994. The citation links allow navigating the literature in unique ways. Papers can be located independent of language and words in the title, keywords or document. A citation index allows navigation backward in time (the list of cited articles) and forward in time (subsequent articles which cite the current article). Citation indexing can be a powerful tool for literature search, in particular:

a. A citation index allows finding out where and how often a particular article is cited in the literature, thus providing an indication of the importance of the article.

Older articles may define methodology or set the research agenda. Newer articles may respond to or build upon the original article.

b. Citations can help to find other publications which may be of interest. Using citation information in addition to keyword information should allow the identification of more relevant literature.

c. The context of citations in citing publications may be helpful in judging the important contributions of a cited paper.

d. A citation index can provide detailed analyses of research trends and identify emerging areas of science.

The Institute for Scientific Information (ISI)® (Institute for Scientific Information, 1997) produces multi-disciplinary citation indexes, which are used to provide several commercial services for searching scientific periodicals. An ISI service is the Keywords Plus® service, which adds citation information to the indexing of an article. Specifically, in addition to the title, author-supplied keywords, and abstract, Keywords Plus adds additional indexing terms which are derived from the titles of cited papers. As a user browses through papers in the ISI databases, bibliographic coupling allows navigation by locating papers which share one or more references.

Another commercial citation index is the legal database offered by the West Group (KeyCite). This database indexes case law as opposed to scientific research articles.

Compared to the current commercial citation indexes, the citation indexing performed by using the present invention has the following limitations: it does not cover the significant journals as comprehensively and it cannot distinguish subfields as accurately, e.g. it will not disambiguate two authors with the same name.

The present invention, Autonomous Citation Indexing (ACI), has significant advantages over traditional citation indexing:

a) No manual effort is required for indexing, resulting in a corresponding reduction in cost and increase in availability. We believe that this can be very important.

b) ACI facilitates literature search based on the context of citations—given a particular paper of interest, an ACI system can display the context of how the paper is cited in subsequent publications. The context of citations can be very important for both literature search and evaluation.

Because ACI does not require human indexers, very significant further benefits result:

a) ACI allows creating more up-to-date databases which can avoid lengthy journal publication delays, because it is not necessary to limit the amount of literature indexed due to human resource requirements. In many areas preprints and conference papers are available long before any corresponding journal publication.

b) The potential for broader coverage of the literature as opposed to indexing only a select set of journals. SCI has been repeatedly criticized for not indexing certain literature.

ACI can improve scientific communication, and facilitates an increased rate of scientific dissemination and feedback.

R. D. Cameron in an article entitled "A universal citation database as a catalyst for reform in scholarly communication", Technical Report CMPT TR 95-07, School of Computering Science, Simon Fraser University (1995), has proposed a "universal [Internet-based] bibliographic and citation database linking every scholarly work ever written". He describes a system in which all published research would be available to and searchable by any scholar with Internet access. Also, citation links between those documents would be recorded and available as search criteria. Such a database would be highly "comprehensive and up-to-date", making it a powerful tool for academic literature research, and for the production of statistics as with traditional citation indexes.

One important difference between Cameron's vision of a universal citation database and the present invention is that the present invention does not require any extra effort on the part of authors beyond placement of their work on the web. The present invention automatically creates the citation database from downloaded documents whereas Cameron has proposed a system whereby authors or institutions must provide citation information in a specific format.

Another area of prior work is the use of semantic distance measures given a set of documents (essentially text strings), there has been much interest in distance (or the inverse, similarity) measurements between documents. Most of the known distance measures between bodies of text rely on models of similarity of groups of letters in the text. One type of text distance measure is the string distance or edit distance which considers distance as the amount of difference between strings of symbols. For example, the Levenshtein distance, as described in an article entitled "Binary codes capable of correcting spurious insertions and deletions of ones (original in Russian)", Russian Problemy Peredachi Informatsii 1, 12–25 (1965), is a well known early edit distance where the difference between two text strings is simply the number of insertions, deletions, or substitutions of letters required to transform one string into another. A more recent and sophisticated example is an algorithm called LikeIt as described by P. N. Yianilos in Technical Report No. 97-093, NEC Research Institute, entitled "The LikeIt intelligent string comparison facility" (1997) and by P. N. Yianilos, in an article entitled "Data structures and algorithms for nearest neighbor search in general metric spaces", in Proceedings of the $4^{th}$ ACM-SIAM Symposium on Discrete Algorithms, pp. 311–321 (1993) and in U.S. Pat. No. 5,978,797 to Yianilos and assigned to the same assignee as the present invention, where a string distance is based on an algorithm that tries to "build an optimal weight matching of the letters and multigraphs (groups of letters)".

Another type of text string distance is based on statistics of words which are common to sets of documents, especially as part of a corpus of a large number of documents. One commonly used form of this measure, based on word frequencies, is known as term frequency times inverse document frequency (TFIDF) as described by G. Salton and C. Yang, in an article entitled "On the specification of term values in automatic indexing", in the Journal of Documentation 29, pp 351–372 (1973). Consider a dictionary of all of the words (terms) in a corpus of documents. In some systems, very common words, sometimes called stop words, such as the, a, and so forth are ignored. Also, sometimes only the stems of words are considered instead of complete words. An often used stemming heuristic introduced by M. F. Porter, in an article entitled "An algorithm for suffix stripping", Program 14, pp 130–137 (1980), tries to return the same stem from several forms of the same word, e.g. "walking", "walk", "walked", all become simply walk. In a document d, the frequency of each word stem s is $f_{ds}$ and the number of documents having stem s is $n_s$. In document d the highest term frequency is called $f_{d_{max}}$. In one such TFIDF scheme, as described in an article by G. Salton and C. Buckley, entitled "Term weighting approaches in automatic text retrieval", in Technical Report 87-881, Department of Computer Science, Cornell University (1987), a word weight $w_{ds}$ is calculated as:

$$w_{ds} = \frac{\left(0.5 + 0.5 \frac{f_{ds}}{f_{d_{\max}}}\right)\left(\log \frac{n_D}{n_s}\right)}{\sqrt{\sum_{j \in d}\left(\left(0.5 + 0.5 \frac{f_{dj}}{f_{d_{\max}}}\right)^2 \left(\log \frac{N_D}{n_j}\right)^2\right)}} \qquad (1)$$

where $N_D$ is the total number of documents. In order to find the distance between two documents, a dot product of the two word vectors for those documents is calculated.

A third type of semantic distance measure is one in which knowledge about document components or structure is used. In the case of research publications for example, citations of papers by other papers has been used to create citation indexes (as described above) which can be used to gauge document relatedness as described by G. Salton, in an article entitled "Automatic indexing using bibliographic citations", Journal of Documentation 27, pp 98–110 (1971).

The third area of prior work is assistant agents. The present invention can be viewed as an assistant agent. Assistant agents are agents designed to assist the user with the use of software systems. These agents may perform tasks on behalf of the user, making interaction with the software system easier and/or more efficient. Many web based assistant agents have been constructed to help the user find interesting and relevant World Wide Web pages more quickly and easily. Many of them such as Moukas, supra; Balabanovic, supra; Menczer, supra; Pazzani et al, supra and those described in an overview of several agents in an article by P. Edwards et al., "Exploiting learning technologies for World Wide Web agents", in IEE Colloquium on Intelligent World Wide Web Agents, Digest No.: 97/118 (1997), learn from user feedback in an environment of word vector features to find more relevant web pages. Interesting changes to known relevant web pages are learned by the "Do-I-Care" agent as described by B. Starr et al, in an article entitled "Do-I-Care: Tell me what's changed on the web", in Proceedings of the AAAI Spring Symposium on Machine Learning in Information Access Technical Papers (1996). This system also allows the agent to learn from the feedback of another user. Although it does no learning, the heuristic web agent "CiFi" as described in an article by S. Loke et al, entitled "CiFi: An intelligent agent for citation finding on the World-Wide Web", in Technical Report 96/4, Department of Computer Science, University of Melbourne (1996), tries to find citations to a specified paper on the World Wide Web.

SUMMARY OF THE INVENTION

An Autonomous Citation Index autonomously creates a citation index from literature in electronic format [printed literature can be converted to electronic form using optical character recognition (OCR)]. An ACI system autonomously locates new articles, extract citations, identifies citations to the same article which occur in different formats, and identifies the context of citations in the body of articles. The viability of autonomous citation indexing depends on the ability to perform these functions accurately.

The ability to recognize variant forms of citations to the same publication is critical to the usefulness of ACI. Without this ability, it would not be possible to group multiple citations to the same publication (e.g. list the context of all citations to a given publication), nor would it be possible to generate statistics on citation frequency (allowing estimation of the importance of articles).

Finding articles can be accomplished by searching the World Wide Web, monitoring mailing lists or newsgroups for announcements of new articles, or by direct links with publishers. Once familiar with ACI systems, researchers may send notification of new papers directly, allowing these papers to be indexed almost immediately. Journal papers are increasingly being made available online at journal web sites. Journals typically charge for access to online papers, and as such one way to index these papers would be to make agreements with the publishers. An ACI system is likely to be beneficial to publishers, because users can be directed to the journal's home page, increasing subscriptions. Pay-per-view agreements may be beneficial for users that do not wish to subscribe to the journals in order to view a single article.

Finding and extracting citations and the context of citations, from articles in electronic form, is relatively simple. For example, the citations are often contained in a list at the end of the article, the list of citations is typically formatted such that citation identifiers, vertical spacing, or indentation can be used to delineate individual citations, and the context of citations is typically marked in a consistent format, e.g. using identifiers such as, "3", "[7]", "[Minsky 92]", or "Williams (1991)". By using a number of rules to account for common variations, these tasks can be performed accurately. When searching for the context of citations, variant forms of citation identifiers, such as listing all authors or only the first author, or varying use of initials between the references section and the main text, can be handled using regular expressions.

The present invention provides an autonomous citation indexing system which indexes literature made available in electronic format, such as Postscript files, on the World Wide Web. Papers, journals, authors and so forth are ranked by the number of citations. The invention extends current capabilities by allowing interactive browsing of the literature. That is, given a particular paper of interest, it is possible to display the context of how the paper is cited in subsequent publications. The context may contain a brief summary of the paper, another author's response to the paper, or a subsequent work which builds upon the original article. Papers may be located by keyword search or by citation links. Papers related to a given paper can be located using common citation information or word vector similarity.

The concept underlying the present invention is generally that given a set of broad topic keywords, use web search engines and heuristics to locate and download papers which are potentially relevant to the given topic. The downloaded papers are parsed to extract semantic features, including citations, citation context, and word frequency information. Citations to identical papers are identified. This information is stored in a database which can be searched by keyword, or browsed by following citation links. It is also possible to find papers similar to a paper of interest by using common citation information or word vector similarity.

A principal object of the present invention is therefore the provision of a computer implemented citation indexing system which extracts citations from articles and identifies syntactic variants of citations to the same work.

Another object of the present invention is the provision of a computer implemented citation indexing system which extracts citations from articles and extracts the context of the citation in the work.

A further object of the present invention is the provision of a computer implemented citation indexing system which combines the use of automatic citation indexing and keyword indexing.

Further and still other objects of the invention will be more clearly understood when the following description is read in conjunction with the accompanying drawing.

BRIEF DESCRIPTION OF THE DRAWINGS

FIG. 2 is a response to a particular keyword search query;

FIG. 3 is a response to another particular keyword search query;

FIG. 4 is a response to a further particular keyword search query;

FIG. 5 shows an example of detailed document information for an item in the response in FIG. 4;

FIG. 6 is a list of papers citing a given article in FIG. 2 along with the context of the citations;

FIG. 7 is a listing of papers similar to that in FIG. 6 but for a different query;

FIG. 10 shows an example of document retrieval using the CCIDF measure for an article in a small database.

DETAILED DESCRIPTION

Figure 1:
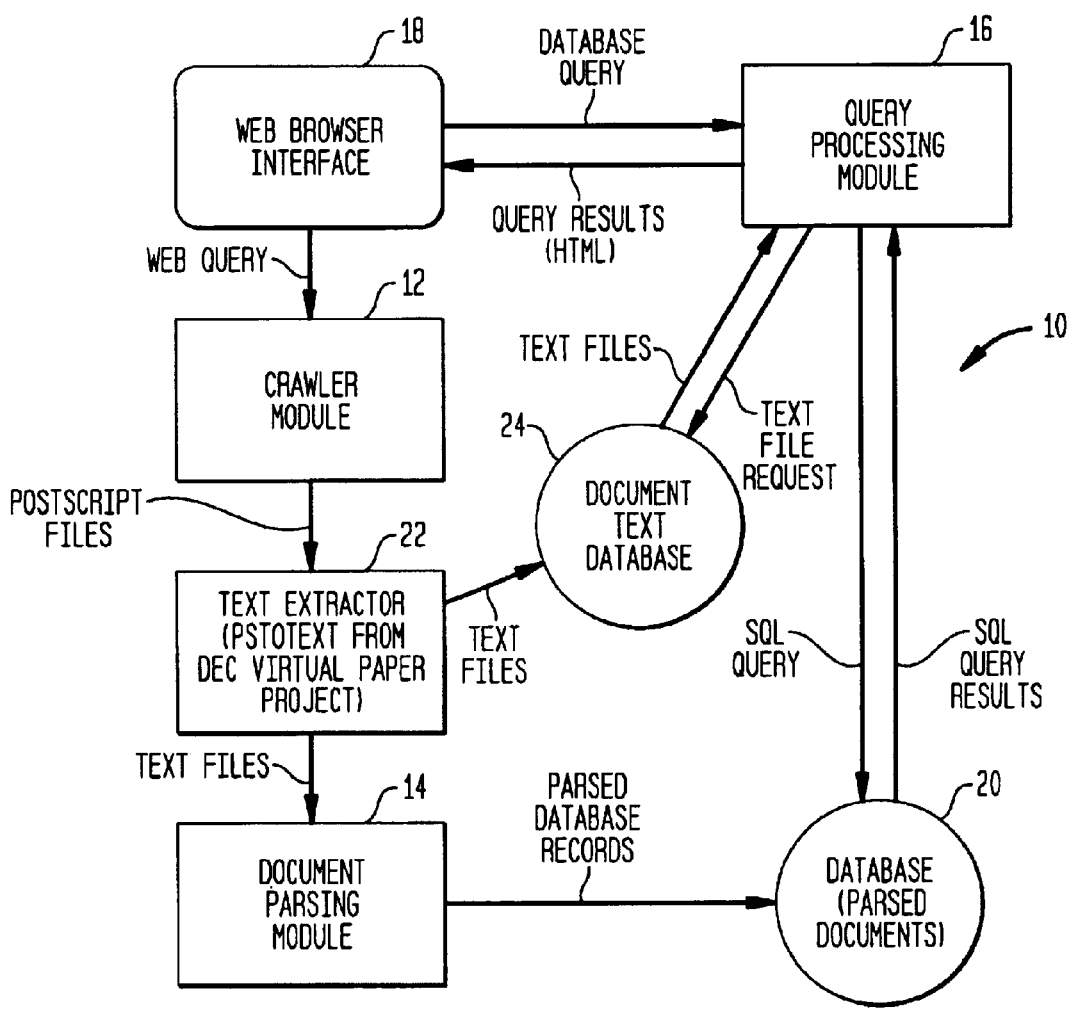
FIG. 1 is a schematic block diagram of a preferred embodiment of the present invention.

Referring now to the figures and to FIG. 1 in particular, there is shown a schematic block diagram of a preferred embodiment of the present invention.

The autonomous citation indexing system 10 comprises three main components: (i) a "crawler" module 12 for the automatic location and acquisition of publications, (ii) a document parsing and database creation module 14, and (iii) a query processing module 16 which supports search by keyword and browsing by citation links through a web browser interface 18 to the world wide web.

Appendix A contains algorithms used in various components of the system. Currently, the only document formats supported are Postscript and PDF (Portable Document Format) because most research publications on the web are currently in Postscript or PDF form. Other formats could be used, e.g. scanned bitmap formats, with appropriate converters, the construction of which is known to those skilled in the art.

The invention is described primarily with reference to scientific publications. However, the invention is equally applicable to the searching of publications in any field, such as legal articles.

The algorithm and the system comprising the present invention may be sometimes hereafter referred to as "CiteSeer".

While reference is made herein to searching the web, the invention is applicable to searching any literature in electronic form and where literature is in non-electronic form, conversion to electronic form by use of optical character recognition (OCR) for example, is possible.

Document Acquisition and Database Initialization

CiteSeer can be used to create comprehensive indexes of literature on the web, or to create indexes of a user-specified topic. When the user wishes to explore a new topic, a new instance of the agent is created for that particular topic. The first step is the initiation of a search for web pages which are likely to contain links to papers of interest. The user initiates a search by providing broad keywords to crawler module 12 using a web browser interface 18. CiteSeer correctly formats queries for several widely used search engines, such as AltaVista, HotBot, and Excite, and uses heuristics to locate papers, e.g. searching for pages which also contain the words "publications", "papers", "postscript". A crawling robot, usenet newsgroups, or internet or intranet mailing lists may also be used for locating and downloading works from the web. CiteSeer locates and downloads Postscript or PDF files identified by ".ps", ".ps.Z", ".pdf", "pdf.Z", "pdf.gz" or ".ps.gz" extensions. Duplicate URLs (Universal Resource Locator) and Postscript files are avoided. While the preferred embodiment of the invention searches Postscript or PDF files, other document formats may also be searched.

When a new CiteSeer agent is created, a new database is created in order to store parsed document information. The database contains the following information: text from the document, the URL of the document, word frequency information for the text of the documents and citations, the text and context of citations, parsed subfield information, and the syntax of queries that are made to the database.

Document Parsing

Document parsing is the processing of downloaded documents to extract semantic features. A CiteSeer agent invokes document parsing module 14 which controls this process by invoking various parsing programs, and performing organizational housekeeping, error log generation, and hardware usage management. The parsing programs extract the desired document features and place them into a database 20. The parsing process can occur simultaneously with the document downloading process.

As documents are searched for by the crawler module 12, the document parsing module 14 watches the download directory and begins the parsing process on documents as they become available. Upon invocation, arguments to the parsing module specify which machines and how many CPUs on each machine may be simultaneously used to parse documents. This allows for many documents to be processed in parallel if the hardware is available. A system of semaphores insures against overload and underload on the specified machines. Before documents are processed, they are moved to a "working" directory, and after the parsing is attempted, they are moved to a "notprocessed" directory upon failure or an "archive" directory upon success. The parsing module also records the results of all processing in log files, including the reason for complete or partial parsing failures.

The first step in document parsing is the conversion of the Postscript file into text in text extractor 22. We currently use the pstotext program from the DEC Virtual Paper Project (http://www.research.digital.com/SRC/virtualpaper/home.html). The text of documents is stored in document text database 24.

Once the formatted ASCII text has been extracted from the Postscript file for a particular document, a few checks are made to verify that the document is a valid research document. These checks include heuristics used to check for the existence of a list of references near the end of the document and a check for non-English documents. Presently, publications in other languages are not processed but such a capability can be added. An attempt is also made to correct the page order of documents which are identified as having reverse page order. Invalid documents are recorded as such and skipped.

Documents identified as valid are then parsed to identify document body features. Heuristics are used to identify the following:

Header: The information at the beginning of the paper that contains the title, author, institution, and other information that comes before the main document text.

Abstract: If it exists, the abstract text is extracted.

Introduction: If it exists, the first 300 words of the introduction section are extracted.

Citations: The list of references made by the document are extracted and parsed further as described below.

Word Frequency: Word frequencies are recorded for all words in the document except those in the citations. The recorded words are stemmed using Porter's algorithm to combine different forms of the same word. The word frequencies are used later in the calculation of word weight vectors where the distance between vectors will be used as a semantic distance measure.

The heuristics used to parse the document body are relatively straightforward. The first (case sensitive) occurrence of the word "Abstract" or "ABSTRACT" is used to identify the beginning of the abstract, while the first occurrence of "Introduction" or "INTRODUCTION" is used to identify the beginning of the introduction, unless these words came too late in the document. Anything before the abstract (or introduction if no abstract) is considered to be the header.

Once the set of references has been identified, individual citations are extracted. Each citation is parsed using heuristics to extract the following fields: title, author, year of publication, page numbers, and citation identifier. The citation identifier is the information in the citation that is used to cite that article in the body of the document (e.g. "[6]", "[Giles97]", "[Marr 1982]"). Word frequencies for each citation are also recorded, with stop word removal and stemming applied the same as in the document word frequency extraction. The citation identifiers are used to find the locations in the document body where the citations are actually made. This allows extraction of the context of the citations.

The heuristics used to parse citations were constructed using an "invariants first" philosophy. That is, subfields of a citation which have relatively uniform syntactic indicators as to their position and composition given all previous parsing, are always parsed next. For example, the label of a citation to mark it in context always exists at the beginning of a citation and the format is uniform across all citations. Also the year of publication exists in almost every citation as a four digit number beginning with the digits "19". Once the more regular features of a citation are identified, trends in syntactic relationships between subfields to be identified and those already identified are used to guess where the desired subfield exists (if at all). For example, author information almost always precedes title information, and publisher information almost always is after the title. This method can be extended by adding the concept of enumerated lists. For example, a list of the canonical form of each publication could be created and the various forms in which the name of the publication appears would map to this canonical form. This canonical form would then be the form stored in the actual CiteSeer database. Citation parsing can also be extended using learning techniques and known bibliographic information.

Formal measurement of the citation parsing statistics has not been performed, however use of the database suggests that performance is adequate for useful browsing and search of documents. The heuristics were designed to be conservative, that is, to identify and reject citations which do not properly fit the manually constructed models rather than try to make a "best guess". Table 1 shows some parsing statistics for two example CiteSeer databases. One was constructed using the broad key words "neural networks" and the other "information retrieval". Note that no attempt was made to exhaustively index all papers found on the web in these areas. Limited size databases are used for efficiency during testing. The results show that the titles and authors can be found in citations roughly 80 percent of the time and page numbers roughly 40 percent of the time. The low number for page numbers detected is probably due (at least partially) to the fact that many citations did not contain page numbers. The year was always found in the citations because the heuristics currently reject any string evaluated as a potential citation in which a year could not be found.

TABLE 1

| Database | Neural networks | Information retrieval |
| --- | --- | --- |
| Documents parsed | 5093 | 2331 |
| Citations found in documents | 89614 | 40007 |
| Titles identified | 71908/89614 = 80.2% | 31346/40007 = 78.4% |
| Authors identified | 73539/89614 = 82.1% | 32154/40007 = 80.4% |
| Page numbers identified | 39595/89614 = 44.2% | 15681/40007 = 39.2% |
| Years identified | 89614/89614 = 100.0% | 40007/40007 = 100.0% |

An Autonomous Citation Indexing (ACI) system also benefits from the ability to identify the bibliographic details of the papers which are indexed. Without this ability, it is not possible to properly analyze the graph formed by citation links. For specific publication venues, it should be possible to take advantage of the regularity across individual articles in order to autonomously extract items such as the title, authors, etc. However, for papers which are autonomously located on the web, on a researcher's homepage for example, the problem is more difficult. We have investigated the problem of determining author and title information from Postscript or PDF files that have been autonomously found on the web. By analyzing the font information, it is relatively easy to extract the title. Accurately identifying the authors is somewhat harder, however it is relatively simple to detect the header of an article, and thus to detect self-citation. Our prototype ACI system currently marks a citation as a self-citation if one of the author's names is located in the header of the indexed article. There are avenues for accurately extracting author names from arbitrary articles. For example, recognizing and parsing the various forms of article headers, creating databases of author names, cross-correlating with bibliographic records, or learning techniques may enable accurate author identification for arbitrary articles. Note that for articles which are found on the web, it may be difficult to determine author affiliations, publication venue, etc. accurately. However, an ACI system can link to the original Web page where the article was located, which typically contains that information.

Database Browsing

The third component of CiteSeer is database browsing using the query processing module 16, which is accessed via a web browser interface 18. Because the database supports concurrent access, browsing is available as soon as the first document is parsed and placed in the document text database 24. The query processing module 16 provides several different browsing capabilities that allow a user to navigate through the document text database 24. Although search by keyword is supported, there is emphasis on using the links between "citing" and "cited" documents to find related research papers. The following is a description of keyword search and browsing by citation links.

The first query to CiteSeer is a keyword search, which returns a list of articles matching the query. The literature can then be browsed by following the links between the articles made by citations. Suppose, for example, the user would like to find all cited papers authored jointly by Giles and Chen in the "neural networks" database mentioned above. The example query, citation: +Giles +Chen asks for all citations which contains the words "Giles" and "Chen". FIG. 2 shows the results of this query. FIG. 3 shows the results of the query dempster. The articles have been ranked by the number of citations to the articles.

The number of documents which cite each reference is given before the reference. CiteSeer can identify the same citation even if it exists in several different formats using an Identical Citation Grouping (ICG) algorithm described below.

The first part of the results from an example keyword search in the documents themselves, document: +recurrent +series, is shown in FIG. 4. Here the header information is given for documents which contain the keyword in their body. Details of a particular document can be found by choosing the link (Details). The first part of the details for the second item in FIG. 4 is shown in FIG. 5. The header, abstract, URL, and list of references made by this document can be seen.

Once an initial keyword search is made, the user can browse the database using citation links. The user can find which papers are cited by a particular publication and which papers cite a particular publication, including the context of those citations. Referring in FIG. 2 to the example of papers authored by Giles and Chen. Suppose the user wishes to know which papers cite the article "Extracting and learning an unknown grammar with recurrent neural networks" shown as the third item in FIG. 2. Choosing the link (Details) returns a list of papers citing the given article along with the context of the citations, as shown in FIG. 6. FIG. 7 shows a similar listing for the context of citations to the first paper from the dempster query. The (Details) links provide details of the citing documents, similar to FIG. 5.

As mentioned in the references to previous work, semantic distance measures between bodies of text are used to measure their "relatedness". Semantic distance measures have been implemented in two applications in CiteSeer: the identification of citations to identical documents and the identification of documents related to a given document.

Citations to a given article can be made in significantly different ways. For example, the following citations, extracted from neural network publications, are all to the same article:

[7] L. Breiman, J. H. Friedman, R. A. Olshen, and C. J. Stone. Classification and Regression Trees. Wadsworth, Pacific Grove, Calif., 1984.
6. L. Breiman, J. Friedman, R. Olshen, and C. Stone. Classification and Regression Trees, Wadsworth, Pacific Grove, 1984.
[1] L. Breiman et al. Classification and Regression Trees. Wadsworth, 1984.

Much of the significance of CiteSeer derives from the ability to recognize that all of these citations refer to the same article. This ability allows (1) a detailed listing of a cited article to show all instances of the citations across multiple articles (as in FIGS. 6 and 7), (2) statistics on citation frequency to be generated, allowing the estimation of the importance of articles, and (3) more accurate identification of sub-fields for a citation, e.g. errors or incomplete fields in one instance of a citation may be resolved from analysis of the group of citations to the same article. More accurate identification of sub-fields for a citation leads to more accurate estimation of statistics based on fields, e.g. the citation frequency for authors.

As suggested by the example citations above, the problem is not completely trivial. We have investigated four methods of identifying citations to identical articles, along with a simple baseline method for comparison.

Normalizing certain aspects of citations tends to improve the results of the following methods. We have used the following normalizations:

Conversion to lowercase.
Removal of hyphens.
Removal of citation identifiers, e.g. [3], [Giles92] at the beginning of the citation.
Expansion of common abbreviations, e.g. conf.→conference, proc.→proceedings.
Common abbreviations for the following words are currently expanded: conference, proceedings, international, society, transactions, and technical report.

Removal of extraneous words and characters which may occur in some, but usually not all, instances of a citation. The following words are removed: pp., pages, in press, accepted for publication, vol., volume, no., number, et. al, isbn. The following characters are removed—&:( )[ ].

The following baseline method was used for comparison with the methods described below:

---

For each citation a
    If this citation has not been grouped yet
        Create a new group with this citation
        For each remaining ungrouped citation b
            Add citation b to the current group if the number of matching . . . words is greater than x% of the length of the . . . shorter citation
        End for
    End if
End for

---

The LikeIt algorithm is an intelligent string comparison algorithm introduced by Yianilos supra. LikeIt is used in the following way:

Sort the citations by length, from the longest to the shortest citation
For each citation c
    Find the group g with the highest value d=LikeIt(c,c)/LikeIt(c,)
    If d is greater than a threshold then add c to the group g
    Else create a new group for this citation
    End if
End for
Order the groups such that each successive group has the most number of words in . . . common with the previous group out of all following groups The final ordering step allows easier identification of errors in the resulting grouping.
The initial sorting step means that the most complete form of each citation is usually encountered first.
The following algorithm is proposed for finding identical citations, which is based on word matching.

Sort the citations by length, from the longest to the shortest citation
For each citation c
  Find the group g with the highest number of matching words
  If the ratio of the number of non-matching words to the number of matching . . . words in c is less than a threshold then add c to the group g
  Else create a new group for this citation
  End if
End for
Order the groups such that each successive group has the most number of words in . . . common with the previous group out of all following groups The current implementation of the algorithm is:

Sort the citations by length, from the longest to the shortest citation
For each citation c
  For each word in the citation
    Find the array of groups containing this word from the words hash table
  End for
  Find the most common group g in the arrays of groups for each word
  If the ratio of the number of non-matching words to the number of matching . . . words in c is less than a threshold then add c to the group g
  Else create a new group for this citation by adding the new group number to . . . the array of groups containing this word, which is contained in a words . . . hash table
  End if
End for
Order the groups such that each successive group has the most number of words in . . . common with the previous group out of all following groups.

We propose the following algorithm for finding identical citations, which is similar to the previous algorithm, with the addition of phrase information.

Sort the citations by length, from the longest to the shortest citation
For each citation c
  Find the group g with the highest number of matching words
  Let a=the ratio of the number of non-matching words to the number of . . . matching words
  Let b=the ratio of the number of non-matching phrases to the number of . . . matching phrases where a phrase is every set of two successive words in . . . every section of the citation containing three or more words (sections . . . are delimited by., or the beginning/end of the citation)
  If (a<threshold1) or (a<threshold 2 and b<threshold 3)
  Then then add c to the group g
  Else create a new group for this citation
  End if
End for
Order the groups such that each successive group has the most number of words in . . . common with the previous group out of all following groups Our current implementation is similar to the previous algorithm (based on a hash table or arrays).

Automatically extracting subfields from citations is difficult. For example, commas can be used to separate fields, but are also used to separate lists of authors, and can be embedded in titles. Full stops can be used to separate subfields or for abbreviations. Sometimes there is no punctuation between fields. The subfield algorithm we have investigated focuses on the title and author subfields, and depends mainly on accurate extraction of the title. Heuristics are used to extract the title, where the main heuristic is "the title is the first subfield containing three or more words", and a number of URLs account for common exceptions. Citations are grouped together if the title and principle author match. Normalization is used, for example to make the algorithm insensitive to the use of dashes and spaces. Multiple hypotheses are used for extracting the principle author. The algorithm is insensitive to whether one or all authors are listed, or whether author first names are used.

We performed quantitative tests in order to evaluate the performance of the various algorithms described above. We downloaded 1,947 AI papers in Postscript form from the web (many more are available) and converted the files to text. We extracted 39,166 citations from these papers, from which we further extracted four subsets, corresponding to citations that contained the words "reinforcement", "constraint", "face", and "reasoning". These sets contained 406, 295, 349, and 514 citations respectively. We manually grouped the citations in each set in order to establish the correct grouping, with the aid of an approximate grouping from one of the algorithms. We used ordering of the groups according to similarity and analysis of the errors made by the algorithms in order to catch errors in the manually constructed correct groupings.

Figure 8:
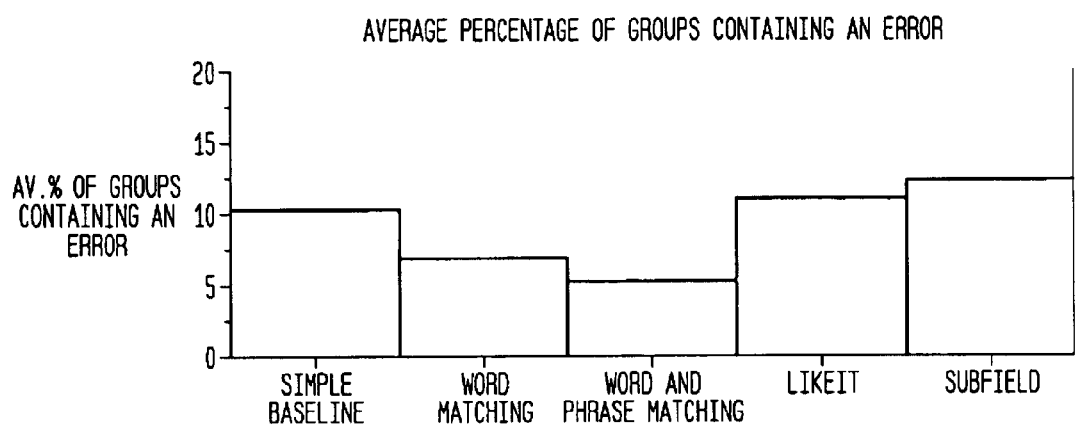
FIG. 8 is a graphical illustration of the results of using different citation grouping algorithms.
Figure 9:
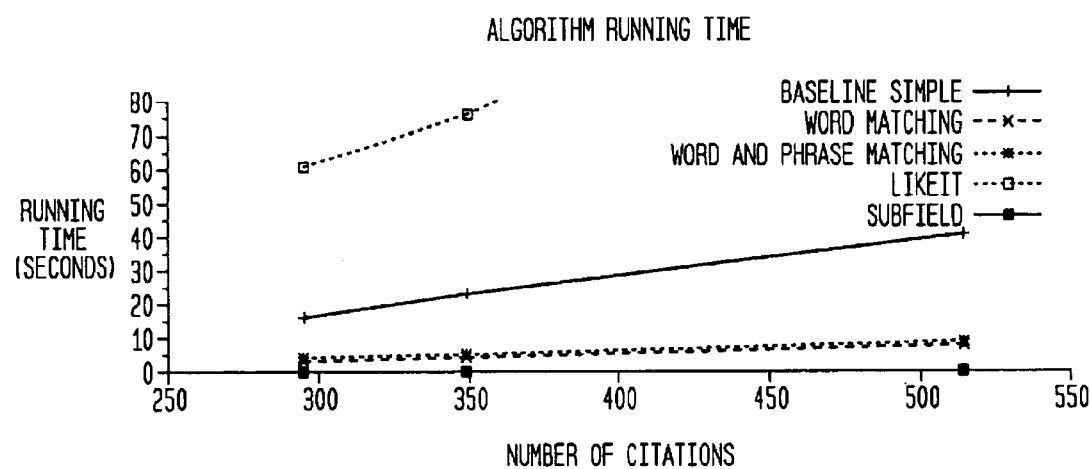
FIG. 9 is a graphical illustration of results of using different citation grouping algorithms.

The set of citations containing the word "reinforcement" was used to tune the parameters in the algorithms (the thresholds on the comparison tests), and the remaining three sets were used for testing. For each algorithm, we compared the automated grouping with the correct grouping, in order to create an error score. The errors that we present here are the percentage of the correct groups for which an error exists in the automated grouping. We also calculated the percentage of insertions and deletions from groups which was helpful in the tuning stage. Tables 2 and 3 show the results with and without normalization respectively, and Table 4 shows the running time of the various algorithms. FIG. 8 shows the average results for the various algorithms, and FIG. 9 shows the running time for the various algorithms.

When using normalization, the average percentage of correct groups that were not 100 percent correct in the automated grouping were, from best to worst: Word and Phrase Matching 5.3%, Word Matching 7%, Baseline Simple 10.3%, Subfield 12.3%, LikeIt 14.3%. Note that an error of 10 percent for example, does not imply that 10 percent of citations are not grouped correctly, e.g. the addition of one incorrect citation to a group marks the entire group as incorrect. Without normalization, the results of all algorithms are worse, except for LikeIt, for which the normalization degrades performance (note that LikeIt does some of the same normalization internally, e.g. LikeIt ignores case by default), and the subfield algorithm which produces the same performance. The average error for LikeIt improved to 11% without normalization. The subfield algorithm results in significantly worse error than the best algorithm, but is significantly more efficient (the complexity is O(n) where n is the number of citations). Of the remaining algorithms, the running time shows significant advantages and favorable scaling properties for the Word Matching and Word and Phrase Matching algorithms, compared to the Baseline Simple and LikeIt algorithms. The scaling of the Word Matching and the Word and Phrase Matching algorithms depends on the co-occurrence of words between citations. It is possible to further speed up these algorithms by partitioning the citations, e.g. according to year (this reduces performance slightly because citations can contain an incorrect year). The algorithms (apart from the core of LikeIt) are currently implemented in Perl, and as such we expect they could be significantly faster if implemented in C++, for example.

The poor accuracy of the edit distance algorithm is of note. One factor that appears important from analysis of the errors that are made by the LikeIt algorithm is that two citations to the same article can be of significantly different lengths—LikeIt does not currently support a containment operation ("is a contained in b?" rather than "is a equal to b?") although there are plans to add such an operation. Alternatively, string distances may not be a good paradigm for determining the semantic similarity of citations, or we may not be using the LikeIt distance in the best manner. LikeIt considers citation strings at the level of letters instead of words, and the order of letters (and thus words). Both of these factors contribute to string differences that may not correspond to semantic differences. Regarding the speed of LikeIt, we note that the interface from Perl to C introduces some delay, and that LikeIt is much faster when comparing a single query against a large database.

TABLE 2

|  | Constraint | Face | Reasoning | Average |
|---|---|---|---|---|
| Number of Citations | 295 | 349 | 514 |  |
| Baseline Sample | 12% | 6% | 13% | 10.3% |
| Word Matching | 9% | 4% | 8% | 7% |
| Word and Phrase Matching | 6% | 3% | 7% | 5.3% |
| LikeIt Algorithm | 13% | 13% | 17% | 14.3% |
| Subfield | 12% | 9% | 16% | 12.3% |

TABLE 3

|  | Constraint | Face | Reasoning | Average |
|---|---|---|---|---|
| Number of Citations | 295 | 349 | 514 |  |
| Baseline Sample | 16% | 12% | 19% | 15.7% |
| Word Matching | 16% | 11% | 20% | 15.7% |
| Word and Phrase Matching | 14% | 9% | 17% | 13.3% |
| LikeIt Algorithm | 9% | 10% | 14% | 11% |
| Subfield | 12% | 9% | 16% | 12.3% |

TABLE 4

|  | Constraint | Face | Reasoning |
|---|---|---|---|
| Number of Citations | 295 | 349 | 514 |
| Baseline Sample | 16 | 23 | 41 |
| Word Matching | 3 | 4 | 8 |
| Word and Phrase Matching | 4 | 5 | 9 |
| LikeIt Algorithm | 61 | 76 | 141 |
| Subfield | 0.05 | 0.06 | 0.08 |

The following methods may be used to achieve improvements to the above algorithms: refinement of the normalization algorithm using quantitative tests, weighting of terms, e.g. according to the inverse collection frequency, and/or using semantic information, e.g. author, year, title, when this information is available from the heuristic parser.

While these algorithms are sufficient for practical use of the citation index, there are many avenues for improvement. For example, learning techniques can be used in order to more accurately parse the subfields of a citation. Large quantities of bibliographic information is freely available on the Web, and this information provides labeled training data that learning techniques can use in order to associate the words and/or the structure of citations with the corresponding subfields. More accurate subfield detection can then be used in order to further improve the accuracy of grouping identical citations.

Given a database of documents, a user may find a document of interest and then want to find other, related documents. This may be done manually by using semantic features such as author, research group, or publication venue for the document. However, CiteSeer also has a mechanism for the automatic retrieval of related documents based on distance measures of semantic features extracted from the documents.

In the prior art, web assistant agents used word frequency information to automatically measure how related two documents are. The philosophy behind this measure is that words that are generally uncommon, but are shared by two documents, give evidence that the two documents discuss similar concepts. While this is useful in some domains, in general it may have limitations which results in inadequate results. One major limitation is the inherent noise in this approach. Uncommon words may be shared by documents by coincidence, thereby giving false evidence that the documents are related. Another limitation of this approach is the ambiguity of words and phrases. For example "arm" could mean a human limb or a weapon. Simple word frequencies do not differentiate these uses, requiring context analysis for separation.

In the present invention several methods are for measuring document similarity.

One very common way to measure document topic similarity is that of word vectors. The present invention implements a TFIDF (Salton and Yang, supra) scheme to measure a value of each word stem in each document where a vector of all of the word stem values represent the "location" of a document in a word vector space. The projection of the word vector of one document on another document (dot product of the vectors) is the distance measure used. Currently, CiteSeer uses only the top few (typically 20) components of each document for computational reasons, however there is evidence that this truncation may not have a large affect on the distance measures (Salton and Buckley, supra).

A string edit distance measure can also be used to determine document similarity. Currently, CiteSeer uses the LikeIt string distance to measure the edit distance between the headers of documents in a database. The header of a document is simply all of the text in a document before the abstract (or the introduction if there is no abstract). The header tends to contain items such as the document title, author name and affiliation, and possibly the publication venue. LikeIt tries to match substrings in a larger string—common authors, institutions, or words in the title which tend to reduce the LikeIt distance between headers. The premise behind the use of LikeIt is that the document header contains important information about the document, and words in similar arrangements indicate documents of similar origin.

Single words (and even phrases to a lesser degree) may not have much power to represent the topic of or concepts discussed in a research paper. Citations of other works on the other hand, are hand picked by the authors as being related documents. It seems intuitive then to use citation information to judge the relatedness of documents. CiteSeer uses common citations to make an estimate of which documents in the downloaded database of research papers are the most closely related to a document picked by the user. This measure, "Common Citation Times Inverse Document Frequency" (CCIDF) is analogous to the word oriented TFIDF (Salton and Buckley, supra) word weights. The algorithm to calculate the CCIDF relatedness of all documents in the database to a document of interest A and choose the best M documents is as follows:

1. Use the Identical Citation Grouping (ICG) algorithm on the entire database of documents to get a count ($c_i$) of how frequently each cited paper i occurs in the database. Take the inverse of these frequencies as a weight for that citation $$\left(w_i = \frac{1}{c_i}\right).$$

This step only needs to be executed once when the database is created.

2. Determine the list of citations and their associated weights for document A and query the database to find the set of n documents [$B_j$]: j=1 . . . n which share at least one citation with document A.

3. For each j=1 . . . n, determine the relatedness of the document $R_j$ as the sum of the weights of the citations shared with document A.

$$R_j = \sum_{i \in A \cap i \in B_j} w_i \quad (2)$$

4. Sort the $R_j$ values and return the documents $B_j$ with the M highest $R_j$ values.

As in the use of TFIDF, CCIDF assumes that if a very common citation is shared by two documents, this should be weighted more highly than a citation made by a large number of documents. Although we have not formally measured the performance of CCIDF, we have found it to be useful, and to perform better than the word vector or LikeIt based automatic similar document retrievers. FIG. 10 shows an example of similar document retrieval using the CCIDF measure in a small database which contains papers related to video coding.

Although we have found that citation based similar document retrieval is subjectively better than word vector or LikeIt based retrieval, CiteSeer also combines different methods of document similarity to result in a final similarity distance measure that may be more accurate than any single method alone. A weighted sum of document similarity measures is used as a combined similarity measure in the following algorithm:

1. Calculate the word vector, LikeIt, and citation similarity measures and normalize each measure to a 0 to 1 scale where 1 represents semantically identical documents, and 0 represents completely different documents (infinite semantic distance). Label the normalized similarity measures between two documents A and B as WV(A,B), LI(A,B), and CI(A,B) respectively.
2. Given a target document A and a set of n candidate documents [$B_j$]: j=1 . . . n, measure the similarity between document A and all n of the $B_j$ documents using the three measures from step 1.
3. Let $w_{WV}$, $w_{LI}$, $W_{CI}$ be the weights given to their respective similarity measures. These weight values are between 0 and 1 and they are always normalized so that $w_{WV}+w_{LI}+w_{CI}=1$.

4. Find a combined similarity measure $S_j$ between document A and each of the $B_j$ documents as the weighted sum:

$$S_j = w_{WV} WV(A,B) + w_{LI} LI(A,B) + w_{CI} CI(A,B) \quad (3)$$

5. Retrieve the documents with the highest $S_j$ values.

Currently, the weights are manually adjusted to the fixed values WV(A,B)=0.25, LI(A,B)=0.25, and CI(A,B)=0.50. It should be possible to incorporate the use of learning techniques to automatically determine the best weights.

The combination based, similar document recommendation mechanism for CiteSeer has been implemented. Given a specific target document, the user chooses (Find Similar Articles) as seen in FIG. 4. The details of typically the ten best documents are returned for display in the web browser.

In summary, CiteSeer is an autonomous citation indexing system which autonomously creates a citation index. An ACI system autonomously extracts citations, identifies identical citations which occur in different formats, and identifies the context of citations in the body of articles. As with traditional citation indexes, ACI allows literature search using citation links, and the ranking of papers, journals, authors, etc. by the number of citations. In comparison with traditional citation indexing systems like SCI, ACI has both disadvantages and advantages. The disadvantages include the limited availability of literature in electronic format, and the possibility of lower accuracy (both of which are expected to become less of a disadvantage over time). However, the advantages are significant and include: a) no manual effort required for indexing, along with a corresponding reduction in cost and increase in availability, b) more up-to-date databases which can avoid lengthy journal publication delays, c) the potential for broader coverage of the literature as opposed to indexing only a select set of journals, and d) the facilitation of literature search based on the context of citations—given a particular paper of interest, an ACI system can display the context of how the paper is cited in subsequent publications. The context of citations can be very useful for literature search and evaluation. Overall, ACI can improve scientific communication, and facilitates an increased rate of scientific dissemination and feedback.

More specifically CiteSeer can be used as an assistant agent that automates and enhances the task of finding interesting and relevant publications on the web, CiteSeer is different from previous citation indexing systems in that the indexing process is completely automatic. CiteSeer autonomously locates, parses, and indexes articles found on the World Wide Web. The advantages CiteSeer provides are that of timeliness and automation. The system indexes preprints and technical reports, as well as journal and conference articles. The publication delay for journals and conferences means that CiteSeer has access to more recent articles. This allows research effort to progress more rapidly, and reduces the possibility of performing work which has already been done by others. The system is completely automatic, and does not require human effort in the indexing process.

Some of the most important capabilities of CiteSeer are:

1. The ability to parse citations from papers and identify citations to identical papers that may differ in syntax. This allows the generation of citation statistics and the grouping of work which cites a given paper.
2. The ability to extract and show the context of citations to a given paper, allowing a researcher to see what other authors have to say about a given paper.
3. The ability to find related articles based on common citations and on word vector or string distance similarity.

While there has been described and illustrated a preferred autonomous citation indexing and literature browser, it will be apparent to those skilled in the art that variations and modifications are possible without deviating from the spirit and broad teachings of the present invention which shall be limited solely by the scope of the claims appended hereto.

What is claimed is:

1. A computer-implemented citation indexing system comprising:

means for locating and acquiring publications in electronic format;

a document parser for extracting semantic features, including citations, from acquired publications; and means for autonomously identifying variant forms of citations to the same publication, where said means for autonomously identifying variant forms of citations to the same publication normalizes citations, sorts citations by length and processes citations in order beginning with the longest length citation, computes distance measures to all previously identified groups of citations for each citation, and either adds the citation to an existing group or creates a new group, where said distance measure comprises word matching.

2. A computer-implemented citation indexing system as set forth in claim 1, where said means for autonomously identifying variant forms of citations to the same publication normalizes citations, sorts citations by length and processes citations in order beginning with the longest length citation, computes distance measures to all previously identified groups of citations for each citation, and either adds the citation to an existing group or creates a new group, where said distance measure comprises word and phrase matching.

3. A computer-implemented citation indexing system as set forth in claim 1, where said means for autonomously identifying variant forms of citations to the same publication normalizes citations, sorts citations by length and processes citations in order beginning with the longest length citation, computes distance measures to all previously identified groups of citations for each citation, and either adds the citation to an existing group or creates a new group, where said distance measure comprises word matching and where said publications in electronic format are publications on the world wide web.

4. A computer-implemented citation indexing system as set forth in claim 2, where said means for autonomously identifying variant forms of citations to the same publication normalizes citations, sorts citations by length and processes citations in order beginning with the longest length citation, computes distance measures to all previously identified groups of citations for each citation, and either adds the citation to an existing group or creates a new group, where said distance measure comprises word and phrase matching and where said publications in electronic format are publications on the world wide web.

5. A method of computer-implemented citation indexing for identifying different forms of citations to the same publication comprising the steps of:

searching for desired publications in electronic format;

locating and acquiring the desired publications;

parsing the acquired publications for extracting and storing semantic features, including citations, from the acquired publications; and autonomously identifying variant forms of citations to the same publication, said autonomously identifying variant forms of citations to the same publication comprising normalizing citations, sorting citations by length and processing citations in order beginning with the longest length citation, computing for each citation, distance measures to all previously identified groups of citations, and either adding the citation to an existing group or creating a new group, where said computing distance measures comprises word matching.

6. A method of computer-implemented citation indexing as set forth in claim 5, said autonomously identifying variant forms of citations to the same publication comprising normalizing citations, sorting citations by length and processing citations in order beginning with the longest length, computing for each citation, distance measures to all previously identified groups of citations, and either adding the citation to an existing group or creating a new group, where said computing distance measures comprises word and phrase matching.

7. A method of computer-implemented citation indexing as set forth in claim 5, said autonomously identifying variant forms of citations to the same publication comprising normalizing citations, sorting citations by length and processing citations in order beginning with the longest length citation, computing for each citation, distance measures to all previously identified groups of citations, and either adding the citation to an existing group or creating a new group, where said computing distance measures comprises word matching and where said publications in electronic format are publications on the world wide web.

8. A method of computer-implemented citation indexing as set forth in claim 5, said autonomously identifying variant forms of citations to the same publication comprising normalizing citations, sorting citations by length and processing citations in order beginning with the longest length, computing for each citation, distance measures to all previously identified groups of citations, and either adding the citation to an existing group or creating a new group, where said computing distance measures comprises word and phrase matching and where said publications in electronic format are publications on the world wide web.

* * * * *